United States Patent [19]

Wilson-Jones et al.

[11] Patent Number: 5,765,116
[45] Date of Patent: Jun. 9, 1998

[54] DRIVER ASSISTANCE SYSTEM FOR A VEHICLE

[75] Inventors: Russell Wilson-Jones, Warwickshire; Raglan Horatio Andrew Harold Tribe, West Midlands; Michael Appleyard, Lancashire, all of England

[73] Assignee: Lucas Industries public limited company, West Midlands, England

[21] Appl. No.: 715,751

[22] Filed: Sep. 19, 1996

Related U.S. Application Data

[63] Continuation of Ser. No. 297,269, Aug. 26, 1994, abandoned.

[30] Foreign Application Priority Data

Aug. 28, 1993 [GB] United Kingdom .................. 9317983

[51] Int. Cl.$^6$ ...................................................... B62D 5/04
[52] U.S. Cl. ........................... 701/41; 180/168; 340/439; 348/119
[58] Field of Search ...................... 364/424.027, 424.033, 364/424.051; 180/167, 168, 169, 141, 142; 348/113, 118, 119; 340/438, 439, 435, 425.5; 701/23, 28, 41

[56] References Cited

U.S. PATENT DOCUMENTS

| | | |
|---|---|---|
| 4,401,181 | 8/1983 | Schwarz ................................ 180/168 |
| 5,208,750 | 5/1993 | Kurami et al. ...................... 364/424.02 |
| 5,245,422 | 9/1993 | Borcherts et al. ...................... 358/103 |
| 5,293,162 | 3/1994 | Bachalo ................................. 340/905 |
| 5,302,956 | 4/1994 | Asbury et al. ............................ 342/70 |
| 5,318,143 | 6/1994 | Parker et al. ........................... 180/268 |
| 5,351,044 | 9/1994 | Mathur et al. ........................... 34/901 |
| 5,373,911 | 12/1994 | Yasui ..................................... 180/168 |
| 5,465,079 | 11/1995 | Bouchard et al. ...................... 340/576 |

FOREIGN PATENT DOCUMENTS 0514343  11/1992  European Pat. Off. .

Primary Examiner—Michael Zanelli
Attorney, Agent, or Firm—Oldham & Oldham Co., L.P.A.

[57] ABSTRACT

A video camera or equivalent sensor is mounted on a vehicle and used to detect the lane markings on the road (usually the white painted lines). An associated signal processor (11) estimates the vehicle's lateral position in relation to the lane markings. An electric motor (4) coupled to the steering mechanism (1) is used to provide a torque input to the steering which may either assist or oppose the steering torque from the driver. The processor (11) is designed to assist the driver to maintain the vehicle's lane position by holding the vehicle at a set-point using a biasing torque. This simulates the effect of the lane being cambered upwards towards the lane edges. However the driver is able to override or cancel the effect if the driver applied steering torque exceeds a prescribed torque threshold.

17 Claims, 8 Drawing Sheets

DRIVER ASSISTANCE SYSTEM FOR A VEHICLE

This is a continuation of application Ser. No. 08/297,269 filed on Aug. 26, 1994, now abandoned.

BACKGROUND OF THE INVENTION

This invention relates generally to a driver assistance system for a vehicle adapted to control the direction of a moving vehicle along a predetermined path.

A recent U.S. Study shows that 25% of all road accidents are caused by unintended road or lane departures. Mounting evidence suggests that many of the accidents are caused by drivers falling asleep, although it is difficult to prove, as many drivers will not admit to this. Automatic lane following systems have been demonstrated operating at motor way speeds, since 1985. Such systems certainly prevent lane departure while lane markings are present, but do not prevent drivers falling asleep. Indeed, there is a danger that a reduced driver work load could even encourage drowsiness.

Presently drivers are required to maintain significant concentration and co-ordination to maintain a central position between lane markings, especially with variations of road camber, road curvature, and cross winds.

EP-A-0 514 343 discloses an automatic lateral guidance control system for guiding moving vehicles. The system includes a sensing subsystem for viewing an area in front of a vehicle, a plurality of energy radiating or energy reflective devices disposed adjacent a predetermined length of road, an apparatus for translating the radiating or reflected information from the viewed area into co-ordinate data representing an approximation of the predetermined path along the road, and a vehicle controller for determining the vehicle's heading with respect to the approximated path and providing an output control signal to correct the vehicle's heading with respect to the approximated path. The system uses past and present position data to calculate a predetermined path for the vehicle. Gain factors and comfort factors are determined to maximise comfort for passengers of the system and to optimise performance of the system. The automatic guidance control system of EP-A-0 514 343 is adapted to control the direction of a moving vehicle without the need for human intervention and the system is more responsive than the control provided by the operator of the vehicle.

SUMMARY OF THE INVENTION

According to our invention a method of tracking a contrived centre line between lane markings of a road characterised in that a steering bias is applied to the steering system of the vehicle in such a manner as to assist the driver in tracking the contrived centre line position.

The contrived centre line may be the true centre line between lane markings, for example on a motor way, or may be offset from the true centre line, for example to facilitate the negotiation of curves or bends when the contrived centre line comprises a more economical tracing a line.

Conveniently the level of steering bias applied to the steering system is relatively small when the track of the vehicle is in proximity to the contrived centre line proximity and the steering bias is adapted to be increased as the vehicle approaches the boundaries defined by the lane markings.

Conveniently a steering torque ripple is applied to the steering system as the vehicle approaches a lane boundary. In addition an audio signal may be produced to alert the driver of possible lane boundary infringement.

The audio signal may simulate that of a "rumble" strip crossing or that of crossing "cats eyes".

The frequency of the audio signal may be proportional or varied in some way according to the velocity of the vehicle and may be arranged to be produced so as to appear from the area of infringement.

The conventional audio system of the vehicle may be utilised to produce the simulated infringement signal. In such a case the conventional audio system may be inhibited during infringement signal simulation or it may be blended with the conventional audio signal output.

If the lane marking signals are lost, a warning is issued to the driver and the system is disabled. Should the lane marking signals be lost due to masking of the signals by a preceding vehicle then the system adopts a vehicle tracking approach until the lane marking signal is re-established.

This system incorporates means for cancelling the signal bias when a direction indicator of the vehicle is actuated. Preferably only that steering bias in the direction of indication is cancelled and steering bias is still applied in the opposite direction of movement of the vehicle with respect to the contrived centre line.

The steering bias is adapted to be applied to the steering system by the use of an electrically operated device, such as an electric motor, which co-operates with the existing, conventional, steering system of the vehicle, which may be power assisted.

The lane markings may be detected by the use of a video camera or equivalent sensor mounted on the vehicle which is "light sensitive" or of the "intra-red" sensing type. An associated signal processor estimates the lateral position of the vehicle in relation to the lane markings. An electric motor coupled to the steering mechanism is used to provide a torque input to the steering system, which may either assist or oppose the steering torque from the driver. The motor is designed to assist the driver in maintaining the position of the vehicle with respect to the lane markings by holding it at a set point using a biasing torque in accordance with signals from the signal processor. This simulates the effect of the lane being cambered upwards towards the lane edges, defined by the lane markings. How ever the driver is able to over-ride or cancel the effect if the steering torque applied to the steering system by the driver exceeds a predetermined torque threshold.

The driver has ultimate control over the vehicle and can over-ride the bias force by virtue of steering wheel torque sensor inputs. The system supplements the existing power steering mechanism whilst also providing a failure back-up in the event of engine stall or pump drive belt failure.

Preferably the electric motor is coupled to the steering mechanism through a gearbox and, possibly also, a clutch. A torque sensor positioned between the steering wheel and the electric motor is adapted to detect the steering effort provided by the driver. The torque sensor typically comprises a compliant element in the steering column shaft whose angle and direction of twist are measured either optically or inductively.

Other methods of torque sensing are possible.

The driver assistance system can also be used as a back-up to the conventional power assisted steering system so that some steering assistance is still available in the event of engine failure, failure of the belt drive to the power steering pump, or other problem. Alternatively, the driver assistance system could be provided as a part of an EPAS (electronic power assisted steering) unit with similar back-up provisions in case of emergency. As a further alternative the system could be provided as a unit added to steering systems previously having no power assisted steering.

In use our invention acts as a lane support system to provide greater comfort to the driver, improved steering stability, and safety.

A method of collision avoidance for a vehicle comprising;
a) monitoring the surroundings of the vehicle for threatening obstacles,
b) permitting lateral movement of the vehicle if no threatening obstacles are detected by monitoring,
c) inhibiting or deterring lateral movement of the vehicle if threatening obstacles are detected by monitoring.

In this way lateral movement of the vehicle from, for example, one lane on a road to another, is only permitted where space for the movement is safely available. Threatening obstacles may be other vehicles which are or are likely to intrude in the space required for the lateral movement due to the respective vehicles velocities, or they may be immobile objects such as barriers, wreckage, or the like, or even particular patterns of markings on the road surface, such as the double lines commonly signifying no overtaking.

If desired the system may be overridden by the vehicles driver. The override may consist of ignoring the warning or applying sufficient torque to overcome the steering bias applied by the system.

Preferably the lateral movement comprises movement from a position in which the vehicle tracks a first contrived centre line between lane markings of a road and a position where he vehicle tracks a second contrived centre line between lane markings defining another lane of a road. Most preferably the second contrived centre line is a lane adjacent to that of the first contrived centre line.

In this way a safe method for changing lanes on a road can be provided, or even for leaving or joining a road by means of a slip road. In such circumstances the system may even extend to velocity control to provide a safe envelope into which the vehicle can move.

The means for deterring lateral movement may comprise any one or more of an audible or visual warning to the driver of the vehicle, a vibration applied to the steering system, or a steering bias applied to the steering system to resist any torque applied so as to cause the undesired lateral movement, such as may be applied by the driver.

In a particularly preferred form the lateral movement is sought automatically in response to the driver indicating a desire to move laterally, such as by activating the vehicles directional indicators or other user/system interface. The system may apply a steering bias so as to maintain the current lateral position if an obstacle is detected or may apply a steering bias so as to affect the lateral movement if no threatening obstacle is detected. Such a system may affect a lane change as soon as possible, after its request, delaying the change for as long as necessary to ensure safe movement.

The monitoring may be restricted to the side and rear of a vehicle and is preferably restricted to the road's lanes.

Monitoring may be continuous or may be activated upon requires or indication of a lane change, or by approach to the edge of a lane.

Electromagnetic wave, leg visual, radar, or other forms of monitoring may be used.

Apparatus for avoiding vehicular collision, comprising:
a) monitoring means on a vehicle for detecting threatening obstacles in the vicinity of the vehicle,
b) lateral movement means for seeking to affect lateral movement of the vehicle,
c) means responsive to signals from monitoring means to deter lateral movement of the vehicle.

DETAILED DESCRIPTION OF THE DRAWINGS

DESCRIPTION OF THE PREFERRED EMBODIMENTS

Embodiments of the invention will now be described by way of example only with reference to the accompanying drawings.

Figure 1:
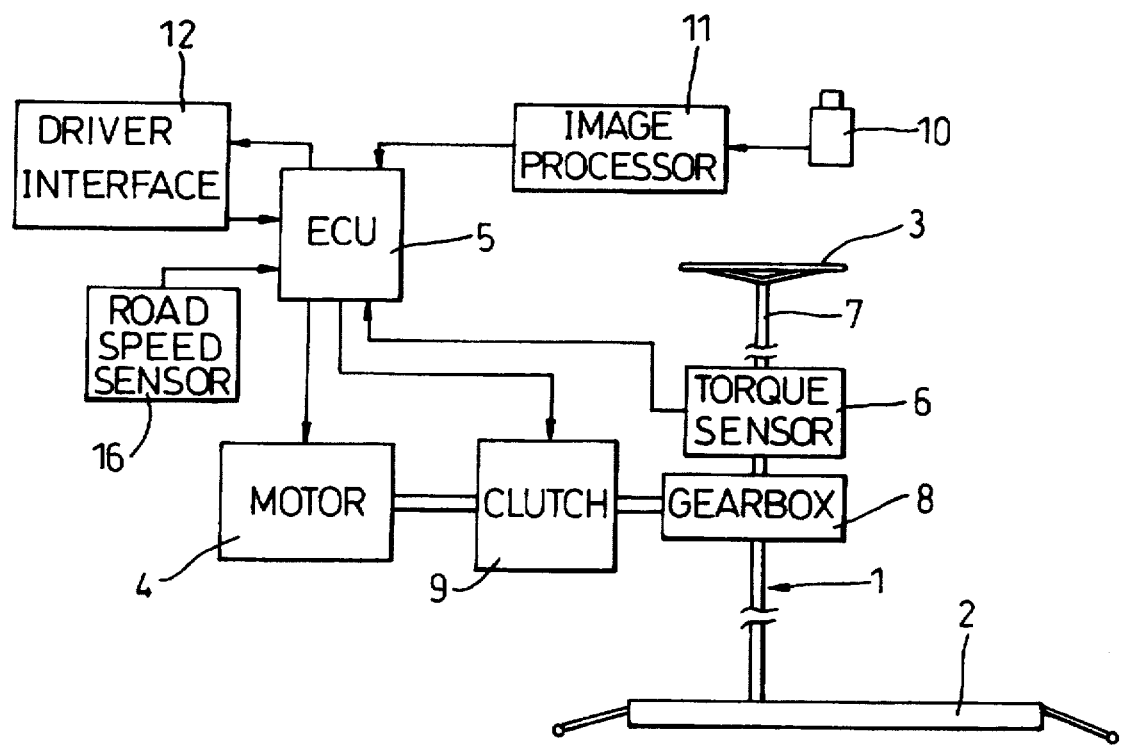
FIG. 1 is a layout of one embodiment of lane support system in accordance with our invention.

The lane support system illustrated in the layout of FIG. 1 is adapted for use with a conventional steering system 1 of a vehicle. As illustrated the conventional steering system comprises a steering rack 2 for controlling the steering position of the front wheels of a vehicle in response to manual operation of a steering wheel 3. An electrically operated motor 4 is adapted to provide servo or power assistance to augment the steering effort applied to the rack 2 from the steering wheel 3 in response to an energising current from an electronic control unit 5, in turn responsive to signals from a torque sensor 6, such as disclosed in EP 0 555 987, comprising a compliant element in the shaft of the steering column 7 whose angle and direction of twist are measured either optically or inductively. The electric motor 4 is coupled to the steering mechanism through a gearbox 8 and a clutch 9 which may be omitted from certain installations.

Figure 2:
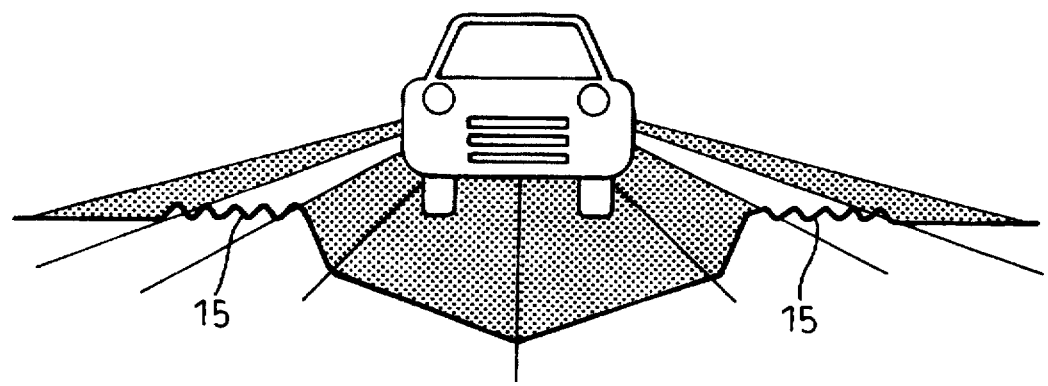
FIG. 2 is a diagrammatic representation of the effect, in use, of the lane support system of FIG. 1.

The vehicle is provided with a video camera 10 which is mounted on the vehicle, for example in the middle of the bonnet or grille, or in the vicinity of the internal rear-view mirror in order to detect the presence of lane markings on a road, for example the spaced white or yellow lines defining a lane of a motor way. The video camera 10 may be "light-sensitive" or of the "intra-red" sensing type. Such systems are disclosed in a technical paper presented to the IEEE in October 1992 entitled "Imposed Obstacle Detection By Sensor Fusion". A signal image processor 11, in response to signals from the video camera 10, estimates the lateral position of the vehicle in relation to the lane markings. Corresponding signals from the signal processor 11 are fed into the electronic control unit 5 which is then operative to energies the motor 4 to apply a torque to the steering shaft to independently assist the driver in maintaining the position of the vehicle with respect to the lane markings by holding it at a set point by the development of an appropriate biasing torque. This simulates the effect of the lane being cambered, as shown in FIG. 2 of the drawings, upwards towards the lane edges, defined by the lane markings.

Figure 4:
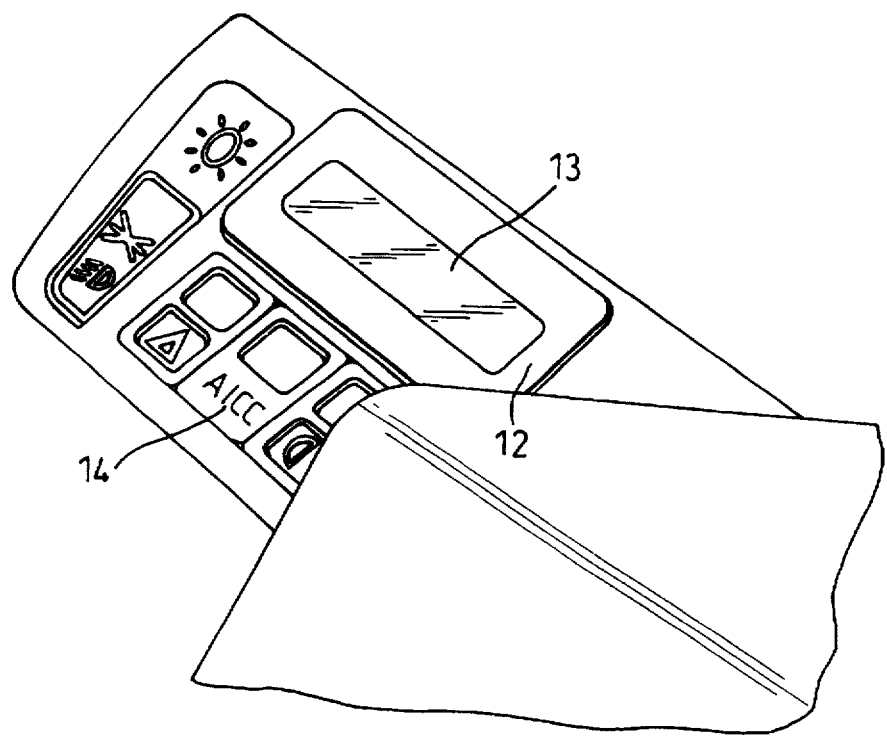
FIG. 4 shows a typical autonomous intelligent cruise control (ACCT.) For use in the system of FIG. 1.

The electronic control unit 5 also receives signals from, and transmits signals to, a driver interface 12 illustrated in FIG. 4 of the accompanying drawings which includes a LCD display 13 and an actuation switch 14.

The electronic control unit 5 also receives a signal from a road speed sensor 16.

Figure 3:
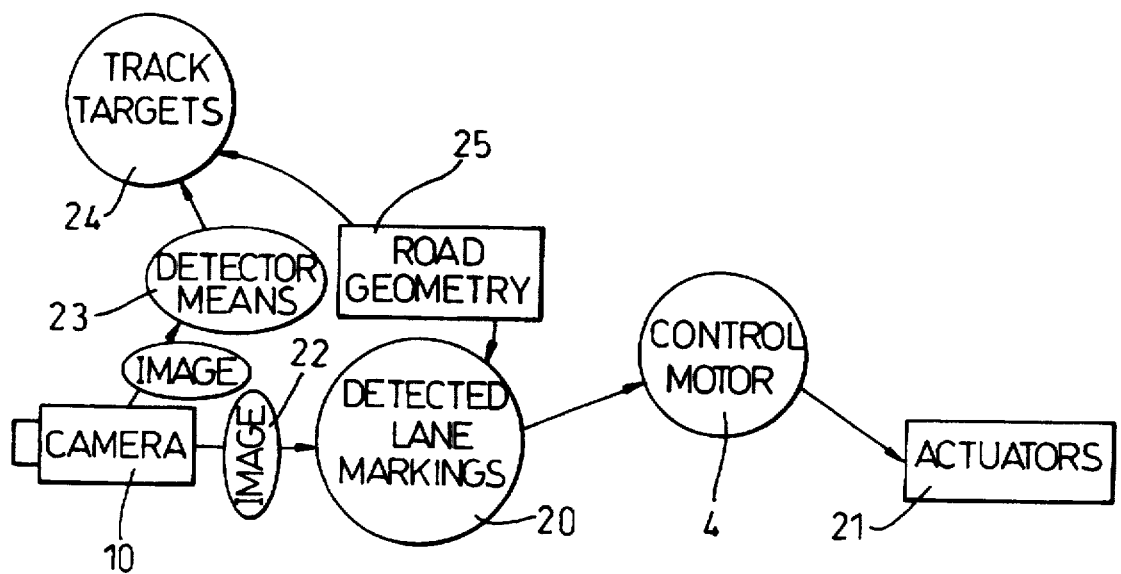
FIG. 3 is a block diagram showing the inter-relationships between the components of the system.

The interrelationship between the components of the system is illustrated in FIG. 3 of the drawings. In its simplest form the video image 22 is used to detect lane markings as represented by block 20 and those detected signals control the motor 4, which in turn controls actuators 21 for operating the steering rack 2. In addition the video image is utilised with detector means 23 for detecting the visual time to impact and target status so that all targets can be tracked as represented by block 24 in accordance with the road geometry as represented by block 25, for example discontinues or disabled lane markings.

The electronic control unit 5 responds to signals from the image processor 11 and produces signals of greater or lesser magnitude to provide, in turn, a greater or smaller bias to the steering system depending upon the displacement of the vehicle from its contrived centre line position. This is equivalent to the camber effect described above, but with the addition, as the vehicle approaches a lane boundary, of inducing an artificial rumble strip 15, as shown in FIG. 2 to induce or apply a feeling of vibration to the steering wheel, thereby alerting the driver to the proximity of the lane marking. The frequency of the vibration may be proportional to the vehicles velocity.

Figure 7:
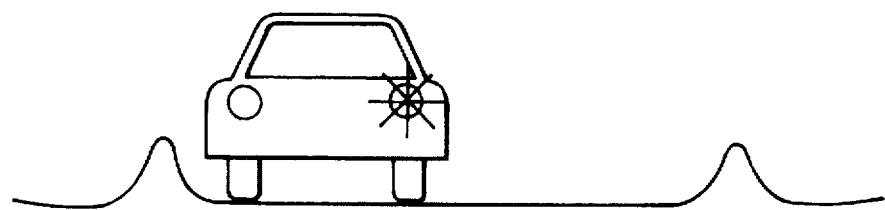
FIG. 7 shows the effect of manual lane chance.

The steering bias applies by the lane support system can be switched on and off by the use of the switch 14 on the driver interface. In addition the system is automatically disabled temporarily when a direction indicator is operated to indicate that the vehicle is moving out of the lane, for example to overtake a vehicle in front. This manual lane change, for example to the left is illustrated in FIG. 7 with the removal of the artificial camber to the left of the vehicle.

Figure 5:
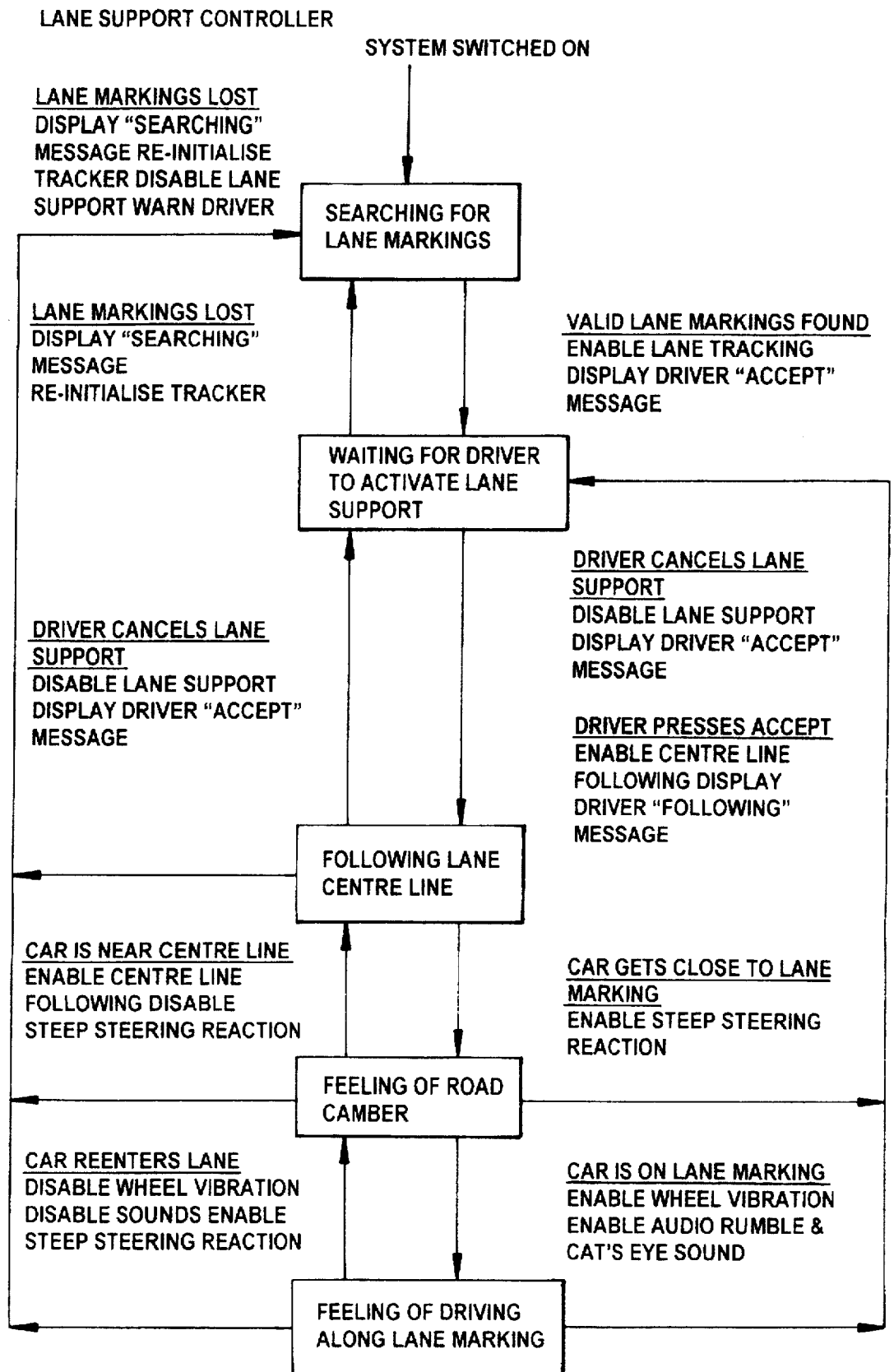
FIG. 5 is a flow chart of the operational features of the system of FIG. 1.
Figure 6:
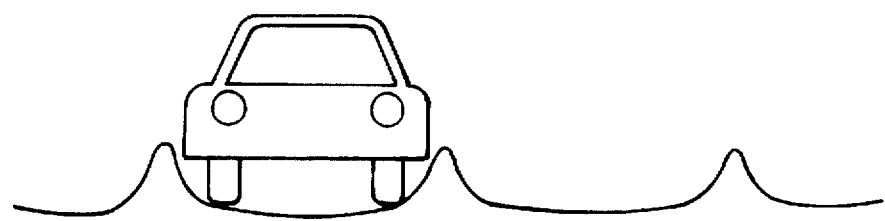
FIG. 6 is a diagram of the virtual road camber induced by the lane support system.

The operation steps and sequence of operations are set out in the flow chart of FIG. 5 of the accompanying drawings.

As illustrated in FIG. 5 the system is first switched on by operation of the switch 14 the display 13 indicates that this has occurred. The system then searches the lane markings. Whilst it is doing this the message on the display 13 reads "searching". As soon as the system locates the lane markings the display 13 displays "accept". If the lane marking is lost the display 13 returns "searching" until it again locates the marking with the display 13 returning to "accept". As soon as the "accept" message appears the driver then presses "accept" button to activate the lane support system. The message "following" is displayed on the display 13. The system then checks the location of the vehicle by following the contrived centre line and applies a light bias to the steering in order to resist any movement away from the centre line position. By turning the steering wheel the driver can resist the bias, but the bias to be resisted increases as the vehicle approaches the lane markings. This provides a sensation of a "feeling" or road camber with the steering bias increasing in accordance with the steepness of the camber.

Should the driver release the steering wheel, the steering bias will automatically return the vehicle back onto the contrived centre line position.

Should the driver resist bias and move closer to the actual lane boundary itself a vibration from an artificially created rumble strip will be felt at the steering wheel. In addition audio messages may be issued as the vehicle crosses a lane marking by utilising the conventional audio system of the vehicle. The conventional audio system may be inhibited during infringement signal simulation or it may be blended with the conventional audio signal output.

At any time the driver can cancel the lane support system by operating the switch. In any case the system is disabled automatically, or may even be switched off, when the driver drives through a lane or, as described above, the camber resistance is cancelled in one direction when the traffic indicator for movement of the car in that direction is operated.

The system can simply be switched off or can be placed in the "actuate" mode in which it will be switched off automatically under the conditions described above.

The lane support system is disabled if lane markings are lost and the interface returns to displaying the "searching" mode, issuing an audible signal to indicate that "search" is taking place.

Figure 8:
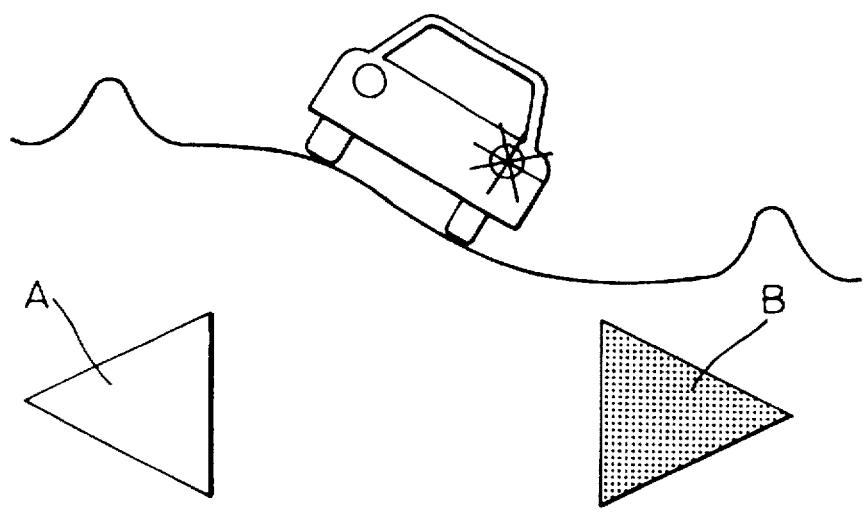
FIG. 8 shows the effect of automatic lane change.

In a modification the system can be adapted continuously to monitor the outside and/or inside lane, as required, and indicate to the driver when it is clear to change lanes. If it is clear then the car will automatically change lane when the driver presses a lane change button, A or B in FIG. 8, or otherwise activates the system and direction indicators may be automatically activated. The steering will feel like the camber on a banked bend as the car changes lane and as illustrated in FIG. 8. Driver override is the same as before.

This modification would reduce driver stress during lane changing, and achieve greater safety and convenience.

Monitoring of the outside and inside lane can also be used to maintain the artificially created camber, even after the driver signals and would, therefore, normally disable it, if the desired lane is not clear. Alternatively or additionally the driver may be warned by either steering or audio feedback of the danger. A detection system of the type used in the forward view could be utilised, for instance a Doppler effect microwave radar device.

The use of hap tic feedback in the steering wheel is considered more effective than audible warnings although, as described above, audible warnings may also be used alternatively or additionally. The system provides position related assistance/resistance in the steering to give an artificial feel of road camber of either side of the lane defined between the two lines. The driver is still expected to steer the vehicle, but experiences the sensation of driving along "the bottom of a bath tub". The system is deactivated by either the use of the indicators or by the driver exceeding the torque-motion input threshold of the steering wheel.

The provision of the clutch 9 has the advantage of improving the feel by disengaging the motor 4 when no lane support assistance is required.

Figure 9:
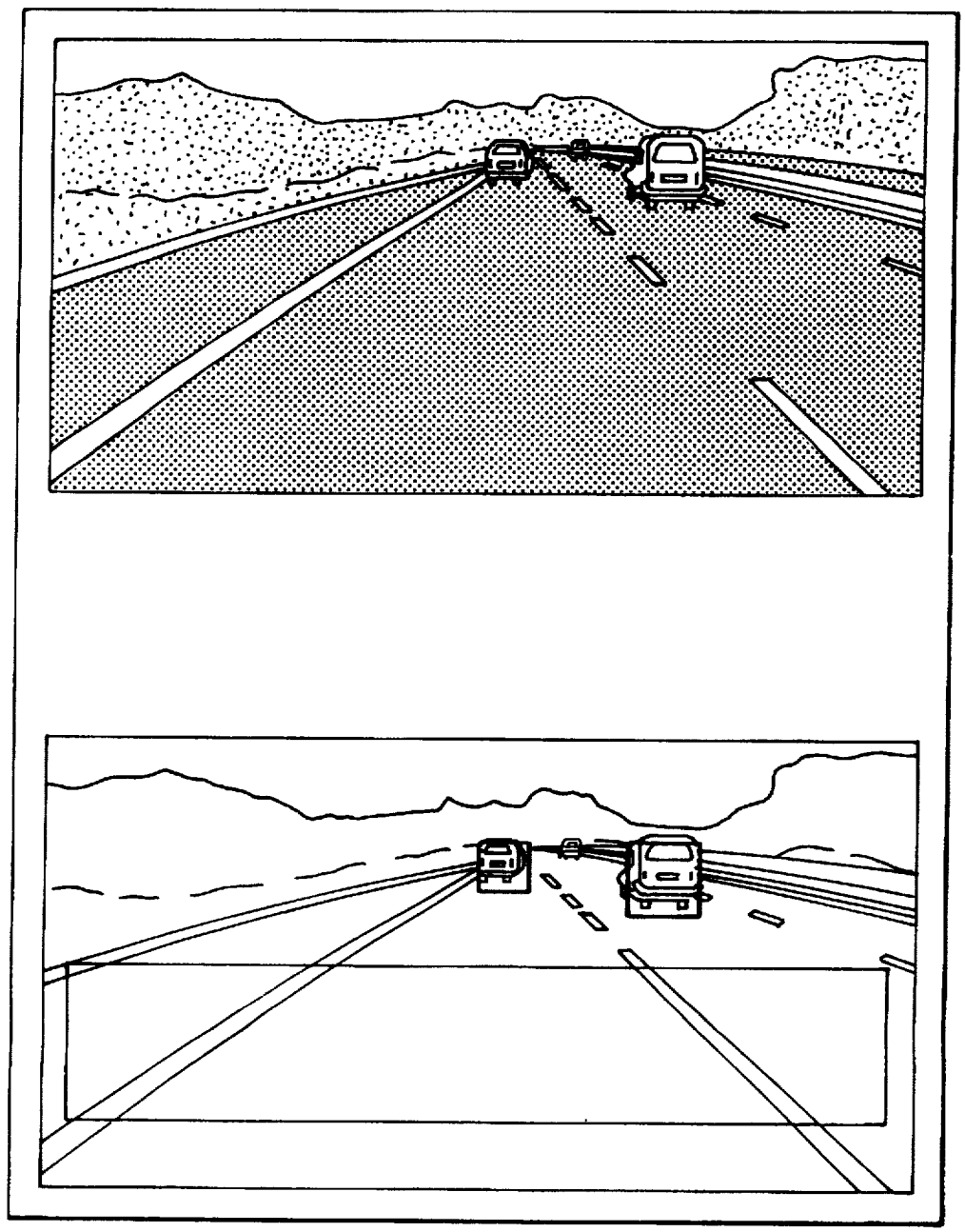
FIG. 9 shows raw image and processed data.

The video based support system is adapted to detect vehicles and lane markings up to a distance of 60 metres. The low lane image processing acquires images from the miniature CCD camera situated by the internal rear view mirror. Edges are extracted using a dual Sobel convolution mask and intelligent thresholds. The edges are then thinned using Morphological techniques as shown in FIG. 9 of the accompanying drawings. The thin edges in the image are then traced by fitting straight lines to them and turn into line vectors, which are then categorised on the basis of angle. The horizontal lines are used by car detection algorithm, and some of the non-horizontal by lane marking detection algorithm. A rear-end car filter locates cars in the image played by processing the horizontal line patterns. Classification of cars and the calculation of angle are good. Ranges estimated from the road to camber geometry by assuming a flat earth.

The operation, interrelationship and calculations involved in a particular embodiment are provided below using the following glossary of abbreviations.

| ABS | Anti-lock braking system |
|---|---|
| AICC | Autonomous intelligent cruise control |
| CAN | Car area network |
| ECU | Electronic control unit |
| EPAS | Electric power assisted steering |
| HyPAS | Hydraulic power assisted steering |
| ICAS | Intelligent collision avoidance system |
| IDS | Intelligent driver support |
| IDS rack | Unit containing lane marking detection electronics |
| LSB | Least significant byte |
| LIMIT | Saturation of limiting function |
| MIL | Malfunction indicator lamp |
| MMI | Man machine interface |
| MSN | Most significant nibble |
| SLEWLIM | Slew limiting function (time dependent) |
| TBD | To be determined |
| X | "Dont care" (for logical states) | and the following definitions

A positive steering torque shall be one that acts to turn the steering wheel clockwise.

A positive steering velocity shall correspond to a clockwise motion of the steering wheel.

The lateral direction shall be positive on moving to the right and negative on moving to the left with the vehicle moving forwards.

The rack ration is defined as the angular displacement of the steering wheel divided by the angular displacement of the road wheels around the straight ahead position.

A number of parameters must be determined in any such system their manner and interrelationship being as follows:

Vehicle speed sensors

There is no direct connection between the vehicle speed sensors and the EPAS ECU. Instead, the vehicle speed is measured by the ABS sensors and the measurement is sent out on the CAN bus.

Steering column position sensor

An absolute steering column position measurement is provided by a potentiometer on the column and is connected to the EPAS ECU. This signal will be termed the "column position pot reading".

Controller input signals

Calculation of lateral position error

The lateral position error 100 is defined to be the difference between the lateral position of the centre of the car 101 and the lateral position of the centre of the lane 102. The error should be positive when a positive change in the steering angle is required to correct the error, i.e. when the car is to the left of the centre of the lane, the error should be positive.

This signal is provided by the IDS rack.

Calculation of rate of chance of lateral position error

The rate of change of lateral position error should be calculated using the difference between the last two available samples of lateral position error that were received from the IDS rack. The rate of change should be positive when the lateral position error is increasing.

Initially the signal will not be used.

Calculation of curvature

The "curvature" is defined to be reciprocal of the "local" radius 103 of a corner, i.e.

$$\text{curvature} = \frac{1}{\text{local radius}}$$

Thus when the road is straight, the radius 103 will be infinite and the curvature will be zero; when the radius 103 is 100 m, the curvature will be 0.01 m$^{-1}$ or 10 km$^{-1}$. The local radius 103 is estimated from the IDS rack information.

If the curvature signal is not valid, then the curvature should be set to zero.

This signal is provided by the IDS rack.

Calculation of heading

Figure 10:
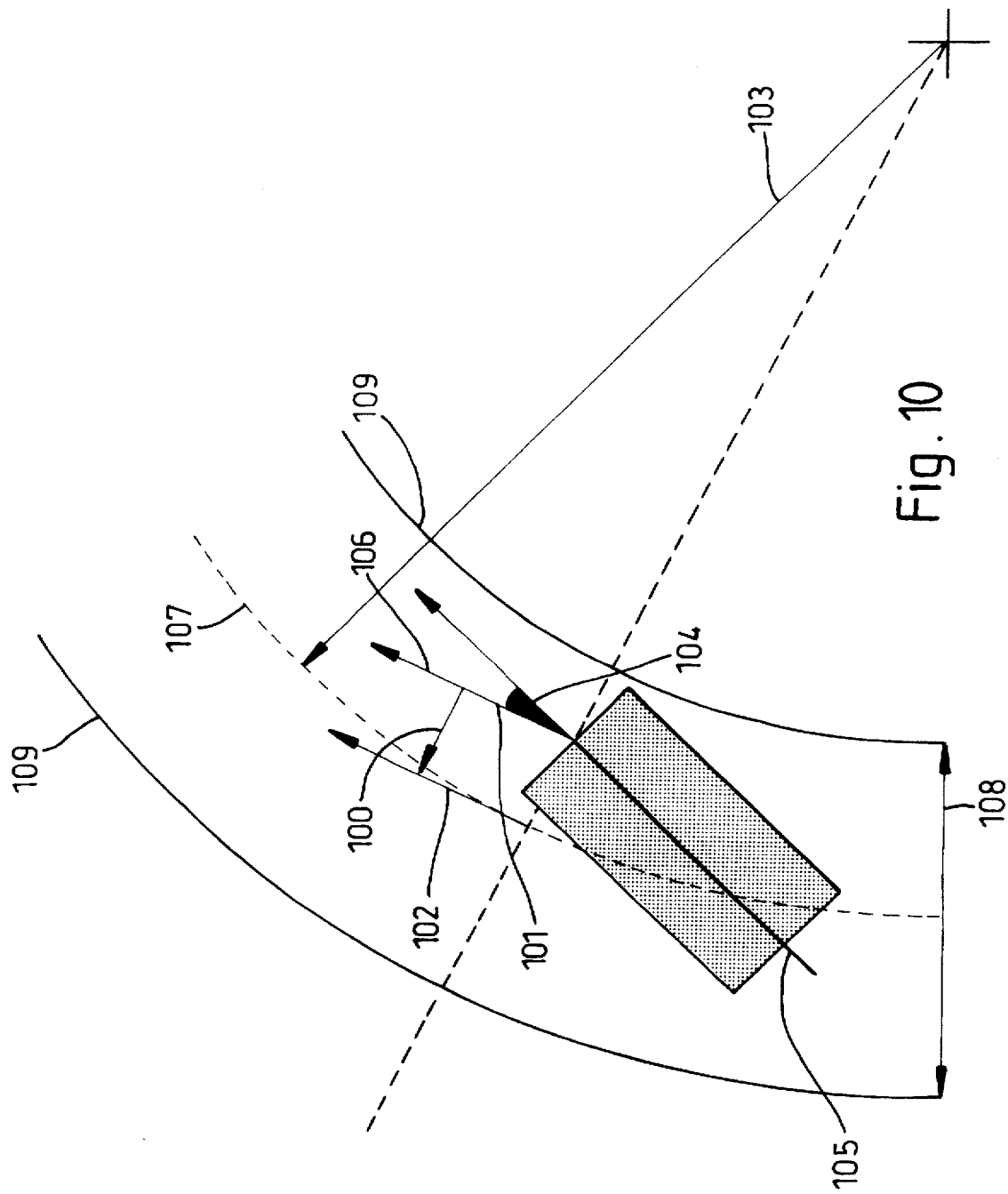
FIG. 10 shows the variables used in the lane guidance calculations.

The heading is defined as the angle 104 between the cars longitudinal axis 105 and the tangent to the lane direction 106, as shown in FIG. 10. The heading should be zero when the car is travelling parallel to the centre of the lane 107. The heading should be positive when the car is heading to the right of the tangent to the lane direction.

This signal is provided by the IDS rack.

Calculation of lane width

The lane width 108 is the distance between the 2 lane boundaries 109 measured the by IDS rack. The lane width should always be greater or equal to zero.

This signal is provided by the IDS rack.

Calculation of steer angle

The steer angle should be calculated using a combination of the EPAS column position measurement and the measurement from the column position potentiometer.

The EPAS column position measurement should be calculated in the standard manner to give;

EPAS steer angle estimate=f(EPAS column position, EPAS steer angle centre, time)

The column position potentiometer should be used to obtain a value of absolute column position. To this value an offset should be added which represents how many turns the steering wheel has made to the left or to the right. The column position pot reading should be scaled to have the same units as the EPAS column position measurement. pot steer angle estimate=column position pot reading+column position pot turn size×number of turns-column position pot zero offset The number of turns should be incremented every time the column position potentiometer wiper reaches the end of its track when the column is turning clockwise. The number of turns should be decremented every time the column position potentiometer wiper reaches the end of its track when the column is turning anti-clockwise.

At power-up, a "steer angle valid" flag should be set to false. The estimate of the steering wheel turn number should be set to zero when the following conditions both hold the magnitude of the column torque is less than the column torque rack centre threshold the vehicle speed is above the vehicle speed rack centre threshold the magnitude of the heading is less than the heading rack centre threshold (and the "lane markings are valid")

The "steer angle valid" flag can then be set to true and the steer angle can be set using the following procedure.

use pot steer angle=column position pot reading–column position pot zero offset then EPAS steer angle centre=EPAS column position–pot steer angle.

The steer angle is then calculated from the average of the EPAS steer angle estimate and the column position sensor estimate, i.e.

steer angle=½ (pot steer angle estimate+EPAS steer angle estimate)

If the magnitude of the difference between the 2 estimates is greater than a give threshold, then the "steer angle valid" flag should be set to false.

| Specification | Units |
|---|---|
| column position pot turn size | bits |
| column position pot zero offset | bits |
| column torque rack centre threshold | Nm |
| vehicle speed rack centre threshold | kph |
| steer angle error threshold | degrees |

Calculation of the steering torque difference

The steering torque difference is the difference between the guiding torque and the driver torque measured by the EPAS column sensor.

steering torque difference=guiding torque–EPAS column torque

The difference is used for diagnostics and for the lane support controller operating logic.

Transfer between the states

It is important that the change in torque is as smooth as possible when transferring between the states under normal operation. When a fault condition occurs, the lane support control should be turned off and the EPAS system should be shut-down as in the failure level 3, which requires servicing of the EPAS system before it can be activated again.

The guidance torque demand shall be passed through a limiter which is ramped between 0 and the maximum guidance torque magnitude in the time specified below.

| | Initial state | Final state | Guidance torque change |
|---|---|---|---|
| B | EPAS on | guiding | ramp up limit to maximum in 1 sec |
| C | guiding | EPAS on | ramp down limit to zero in 1 sec |
| D | guiding | suspended | ramp down limit to zero in 1 sec |
| E | suspended | guiding | ramp up limit to maximum in 1 sec |
| F | suspended | EPAS on | guidance torque should be zero |
| G | EPAS on, guiding, suspended | EPAS disengaged | fast change to zero guidance torque |
| H | EPAS disengaged | EPAS on | guidance torque should be zero |

Figure 11:
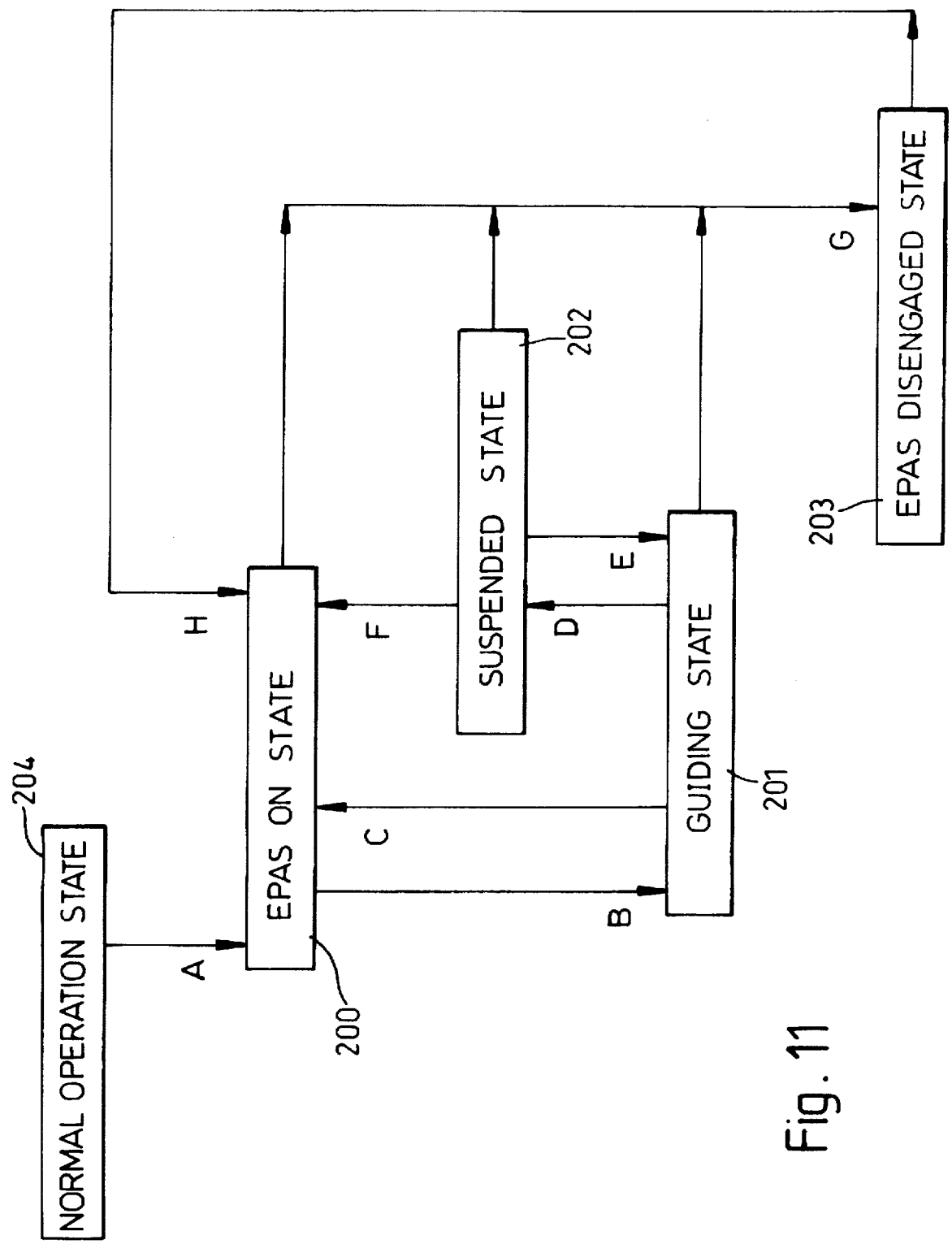
FIG. 11 shows the various states and interrelationship for a system.

The letters B to H in the table indicate the state transitions as shown in FIG. 11. The conditions for each state transition to occur are described below.

Intermediate conditions

To simplify the description of the transitions between the states, some intermediate signals shall be specified.

The "ready for engagement" condition shall be true when all of the following conditions hold the magnitude of driver torque is less than an engagement threshold the magnitude of curvature is lower than e given threshold—i.e. road is "straight"

the magnitude of heading angle is lower than a given threshold—i.e. car is "straight"

the magnitude of steer angle is less than an engagement threshold the magnitude of steering column velocity is less than an engagement threshold the lane width is greater than an engagement threshold the magnitude of the lateral position error is less than an engagement threshold.

| Specification | Units |
|---|---|
| driver torque engagement threshold | Nm |
| road curvature engagement threshold | m⁻¹ |
| heading angle engagement threshold | degrees |
| steering angle engagement threshold | degrees |
| column velocity engagement threshold | rev/s |
| minimum lane width engagement threshold | m |
| lateral position error engagement threshold | m |

The "force lane support off" condition shall be true when any of the following conditions hold the magnitude of driver torque exceeds the driver torque disengagement threshold the curvature of a corner is greater than a disengagement threshold the heading angle is greater than a disengagement threshold the magnitude of steer angle exceed a disengagement threshold the magnitude of the column velocity exceeds a threshold the lane width is less than a disengagement threshold the magnitude of the steering torque difference exceeds the torque difference disengagement threshold

| Specification | Units |
|---|---|
| driver torque disengagement threshold | Nm |
| road curvature disengagement threshold | m⁻¹ |
| heading angle disengagement threshold | degrees |
| steering angle disengagement threshold | degrees |
| column velocity disengagement threshold | rev/s |
| minimum lane width disengagement threshold | m |
| torque difference disengagement threshold | Nm |

The "lane support data is valid" condition shall be true when all of the following conditions hold the lane marking information is valid the steer angle is valid the vehicle speed is valid the CAN interface is active—i.e. there is no "CAN message fault".

Entry to EPAS on state (transition A)

The following conditions must all hold before the system can enter the EPAS on state, 200 the EPAS system must pass all of its internal diagnostics to check its correct operation and be in the "normal operation" state the vehicle must be stationary Transition from EPAS on state to guiding state (transition B)

All of the following conditions must hold before the system can enter the guiding state 201, "lane support on" signal is true all turn signals are off the "ready for engagement" condition must be true the "lane support data is valid" condition must be true.

Transition from guiding state to EPAS on state (transition C)

If any of the following conditions occur, the system should revert to the EPAS on state 200, a lane marking is crossed the "lane support on" signal goes false the "lane support data is valid" condition goes false
the "force lane support off" condition goes true.
Transitions to and from the suspended state (transitions D, E and F)

The lane support can be suspended temporarily under the conditions given below.

When in guidance state switch to the suspended state 202 if the "turn signal is on" signal is set.

When the suspended state 202, resume lane support (i.e. switch to the guiding state) if all of the following conditions hold the turn signal is turned off the "ready for engagement" condition must be true When in the suspended state 202, exit to the EPAS on state 200 if all of the following conditions apply the time in the suspended state exceeds the maximum the "lane support on" signal goes false the "lane support data is valid" condition goes false the "force lane support off" condition goes true

| Specification | Units |
|---|---|
| maximum time in suspended state | s |

Transition to and from the EPAS disengaged state (transitions G and H)

If any of the following conditions occur, the system should move to the EPAS disengaged state 203.

disengage EPAS flag is set true by monitor program.

The lane support controller should switch from the EPAS disengaged to the EPAS on state if all of the following conditions apply;

disengage EPAS flag is set false by monitor program.

Exit from normal operation

The standard exit from normal operation 204 that are defined in the EPAS Functional Specification should be maintained (for example, when the ignition is turned off).

When any of the lane support diagnostics signal a fault, the system should be shut-down to the EPAS fault level 3 that is EPAS is disabled until the system is services. The driver should be warned when such a shut-down occurs as discussed below.

The manner in which the guidance torque is removed is preferably fast, although smooth removal could be provided for.

| Specification | Units |
|---|---|
| lane position error engagement threshold | m |
| lane position error resume threshold | m |
| minimum width threshold | m |
| driver torque engagement threshold | Nm |
| driver torque disengagement threshold | Nm |
| torque difference disengagement threshold | Nm |
| column velocity disengagement threshold | rev/s |
| column velocity engagement threshold | rev/s |
| road curvature engagement threshold | $m^{-1}$ |
| road curvature disengagement threshold | $m^{-1}$ |
| heading angle engagement threshold | degrees |
| heading angle disengagement threshold | degrees |
| guidance time-out interval | s |
| maximum time in suspended state | s |
| maximum steering angle threshold | degrees |

Control algorithm

The control strategy takes the lane position information from the IDS rack and combines it with the vehicle speed to produce an estimate of desired steering wheel position. The error between the desired steering wheel position and the actual steering wheel position is passed through a proportional gain and a limit to produce a guidance torque demand.

Figure 12:
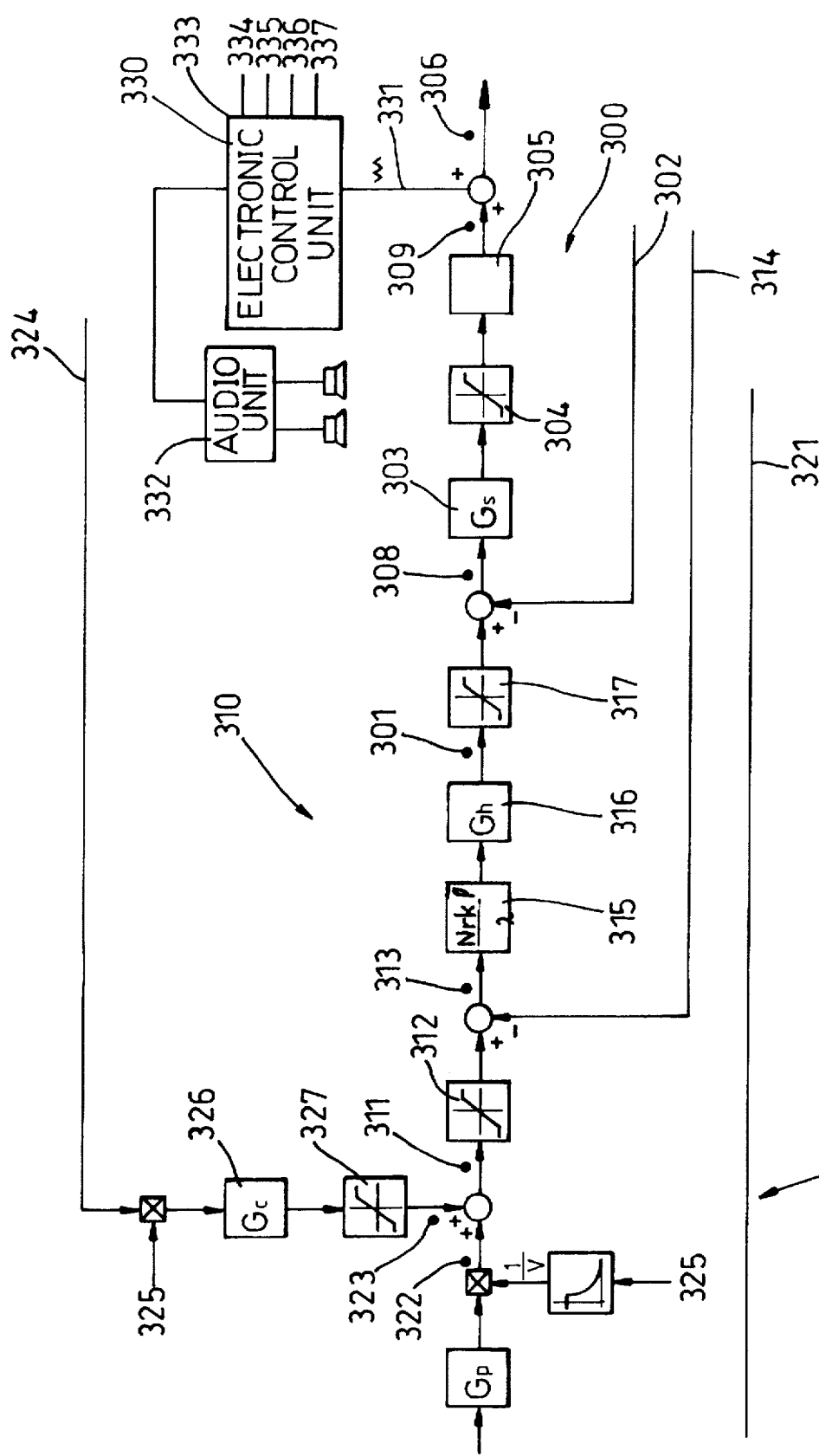
FIG. 12 is a block diagram of a lane guidance control strategy.

A block diagram of the controller is shown in FIG. 12. The controller is formed from a number of loops. The innermost loop is the steering angle control loop 300. This loop takes a limited steer angle demand 301 and calculates a steer angle error 308 using the measured steering angle 302. The error is then passed through the steer angle gain 303 to give a guidance torque demand 309. The guidance torque demand 309 is limited 304 and slew rate limited 305 before being sent to augment the EPAS control torque 306. The limits on guidance torque demand 309 and on steer angle demand 301 are varied with vehicle speed. The slew rate limit output should be set to zero whenever the guiding state is entered.

steer angle error=LIMIT(steer angle demand)-steer angle guidance torque demand=SLEWING(LIMIT(steer angle gain×steer angle error))

The second loop 310 controls the heading angle. The heading demand 311 is limited 312. The heading error 313 is calculated from the difference of the limited heading demand 312 and the measured heading 314. The difference is passed through 2 gains. The first gain is the vehicle factor 315. The second gain is the heading gain 316. The heading gain 316 converts the error into the steer angle demand 317. The vehicle factor is a single constant that is calibrated from 3 vehicle-dependent parameters: rack ratio, wheel base length and under steer factor.

heading error LIMIT=(heading demand)-heading steer angle demand=heading error×heading gain ×vehicle factor vehicle factor=rack ratio×wheel base/under steer factor The outer loop 320 controls the lateral position. The lateral position error 321 is first multiplied by the reciprocal of vehicle speed to give a "normalised" position correction heading 322. The position correction heading is added to the limited curve balance feedforward 323 to give the heading demand 311.

position correction heading=lateral position error× reciprocal vehicle speed heading demand=position correction heading+curve balance feedforward.

The vehicle speed reciprocal calculation should only occur at speeds above 40 kph. At speeds below this, the vehicle speed reciprocal should be set to $1/40$ $kph^{-1}$ to prevent the algorithm dividing by zero.

vehicle speed reciprocal=1/LIMIT (vehicle speed)

The curve balance feedforward 323 referred to above is calculated from the produce of the curvature measurement 324 and the vehicle speed 325. This product is passed through the curve balance gain 326 and then limited 327 to give the curve balance feedforward. NB the curve balance heading limit 323 will give to be set to zero if the curvature measurement 324 is not available.

curve balance heading=LIMIT (curvature×vehicle speed× curve correction gain)

The limits on guidance torque demand and on steer angle demands are determined by ranges relating to vehicle speed.

Automatic lane change

The automatic lane change function senses the turn signal to change lane and uses a blind spot monitor (TbD) to establish whether the lane is clear for the car to move into. If the lane is clear, a guidance torque is applied to move the car to an adjacent lane using information from the lane marking sensor to steer the vehicle smoothly.

Given the various safety considerations as much of the system as possible is subject to be initiation and continuing diagnostic checks. In the event of a problem or irregularity being detected a warning may be given, or the system may temporarily shut down.

Driver warnings

There are 2 means for warning the driver, by means of the warning control 330, of events recognised or initiated by the system. The first is by "shaking the stick" (=steering wheel) 331 and the second is to issue an audible warning 332 to the driver.

Hap tic feedback signal

The driver may be warned by a deliberate vibration of the steering wheel. This function shall be termed hap tic feedback.

The hap tic feedback will consist of a symmetric triangle wave which will be added to the guidance torque demand. The amplitude and frequency of the vibration shall be fixed.

| Specification | Units |
|---|---|
| Haptic feedback frequency | Hz |
| Haptic feedback amplitude | Nm pk-pk |
| Haptic feedback duration | second |

Audible warning signal

A message shall be sent to the MMI controller, requesting a driver warning. NB this may change—the IDS rack may be used to give a number of different audible warnings.

Warnings

The warnings are described in the following sections. The table below gives the full list of warnings, together with the operating modes in which they should be issued. The warnings should be repeated at the given rate for as long as the condition is true. In the case of the lane marking warnings, the lane markings must be valid. The warnings arise as a result of a number of inputs to the warning control, these being velocity 333, lane width 334, lateral position error 335, lane moulding threshold 336 and car width 337.

| Warning | Lane support state | Warning means | Warning repetition rate |
|---|---|---|---|
| Close to lane marking | guiding only | Haptic feedback | once every 3 seconds |
| Very close to lane marking | guiding only | Haptic feedback | once every second |
| Crossing solid lane marking | any except disengaged | Haptic feedback | once only |
| Lane support disengaged | disengaged | Audible signal | once only |
| Shut-down | any | Audible signal | twice |

Close to lane marking

This is given by the following condition ½ (lane width–car width)–lateral position error magnitude<lane marking close threshold.

The warning should be disabled when the width of the lane is small, i.e. when lane width–car width<narrow lane threshold.

The narrow lane condition may not be invoked if the control logic condition on lane width is breached before the narrow lane threshold.

| Specification | Units |
|---|---|
| lane marking very close threshold | m |
| narrow lane threshold | m |

Very close to lane marking

This condition holds when ½ (lane width–car width)–lateral position error magnitude<lane marking crossed threshold.

The warning should be disabled when the width of the lane is small as above.

| Specification | Units |
|---|---|
| land marking very close threshold | m |

Crossing solid lane marking

This is similar to the "close to lane marking condition" and is given by the following condition. ½ (lane width–car width)–lateral position error magnitude<lane marking crossing threshold.

The warning should be disabled when the width of the lane is small as above. The warning should only occur when the vehicle speed is greater than the given value.

| Specification | Units |
|---|---|
| lane marking very close threshold | m |
| minimum vehicle speed | kph |

Lane support disengaged

When the lane support control is disengaged for any reason a warning should be issued.

We claim:

1. A method of facilitating steering of a vehicle by tracking a contrived centre line of a road, said vehicle being provided with a steering system, and said contrived centre line being a centre line between lane markings defining a lane boundary on said road, comprising:

applying a steering bias to the steering system in such a manner as to assist the driver in tracking said contrived centre line, and as the vehicle approaches a lane boundary, producing an audio signal to alert the driver of possible lane boundary infringement, in which the audio signal gives the illusion of originating from an area of the lane boundary infringement.

2. The method of facilitating steering of a vehicle in accordance with claim 1, wherein the level of said steering bias applied to said steering system is relatively small when said vehicle is in proximity to said contrived centre line and said steering bias is adapted to be increased as said vehicle approaches a boundary defined by said line markings.

3. The method of facilitating steering of a vehicle in accordance with claim 2, wherein a ripple is applied to said steering bias by said steering system as said vehicle approaches a lane boundary.

4. The method of facilitating steering of a vehicle in accordance with claim 3, wherein said audio signal is produced on a conventional audio system of said vehicle.

5. The method of facilitating steering of a vehicle in accordance with claim 3, wherein in the event that said lane markings are lost, a warning is issued to the driver and said steering bias is disabled.

6. The method of facilitating steering of a vehicle in accordance with claim 1, wherein said audio signal is produced on a conventional audio system of said vehicle.

7. The method of facilitating steering of a vehicle in accordance with claim 1, wherein in the event that said lane markings are lost, a warning is issued to the driver and said steering bias is disabled.

8. The method of facilitating steering of a vehicle in accordance with claim 1, wherein said system incorporates means for cancelling said steering bias when a direction indicator of said vehicle is actuated.

9. The method of facilitating steering of a vehicle in accordance with claim 1, further including the step of varying said audio signal according to the velocity of said vehicle.

10. The method of facilitating steering of a vehicle in accordance with claim 9, wherein the level of said steering bias applied to said steering system is relatively small when said vehicle is in proximity to said contrived centre line and said steering bias is adapted to be increased as said vehicle approaches a boundary defined by said line markings.

11. The method of facilitating steering of a vehicle in accordance with claim 10, wherein a ripple is applied to said steering bias by said steering system as said vehicle approaches a lane boundary.

12. The method of facilitating steering of a vehicle in accordance with claim 9, wherein said audio signal is produced on a conventional audio system of said vehicle.

13. The method of facilitating steering of a vehicle in accordance with claim 9, wherein in the event that said lane markings are lost, a warning is issued to the driver and said steering bias is disabled.

14. A method of facilitating steering of a vehicle by tracking a contrived centre line of a road, said vehicle being provided with a steering system, and said contrived centre line being a centre line between lane markings defining a lane boundary on said road, comprising:

detecting said lane markings defining said lane boundary on said road, calculating a position of said contrived centre line based upon said lane markings, and then applying a steering bias to the steering system in such a manner as to assist the driver in tracking said contrived centre line, and as the vehicle approaches a lane boundary, producing an audio signal to alert the driver of possible lane boundary infringement, in which the audio signal gives the illusion of originating from an area of the lane boundary infringement.

15. The method of facilitating steering of a vehicle in accordance with claim 14, wherein in the event that said lane markings are lost, a warning is issued to the driver and said steering bias is disabled.

16. The method of facilitating steering of a vehicle in accordance with claim 14, further including the step of varying said audio signal according to the velocity of said vehicle.

17. The method of facilitating steering of a vehicle in accordance with claim 14, wherein the level of said steering bias applied to said steering system is relatively small when said vehicle is in proximity to said contrived centre line and said steering bias is adapted to be increased as said vehicle approaches a boundary defined by said line markings.

* * * * *